Dec. 23, 1969   H. C. CUSTARD   3,485,103
APPARATUS FOR MEASURING GRAVITY
Filed Oct. 22, 1965   2 Sheets-Sheet 1
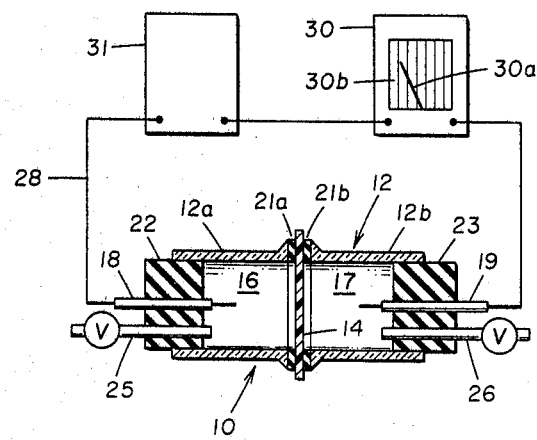
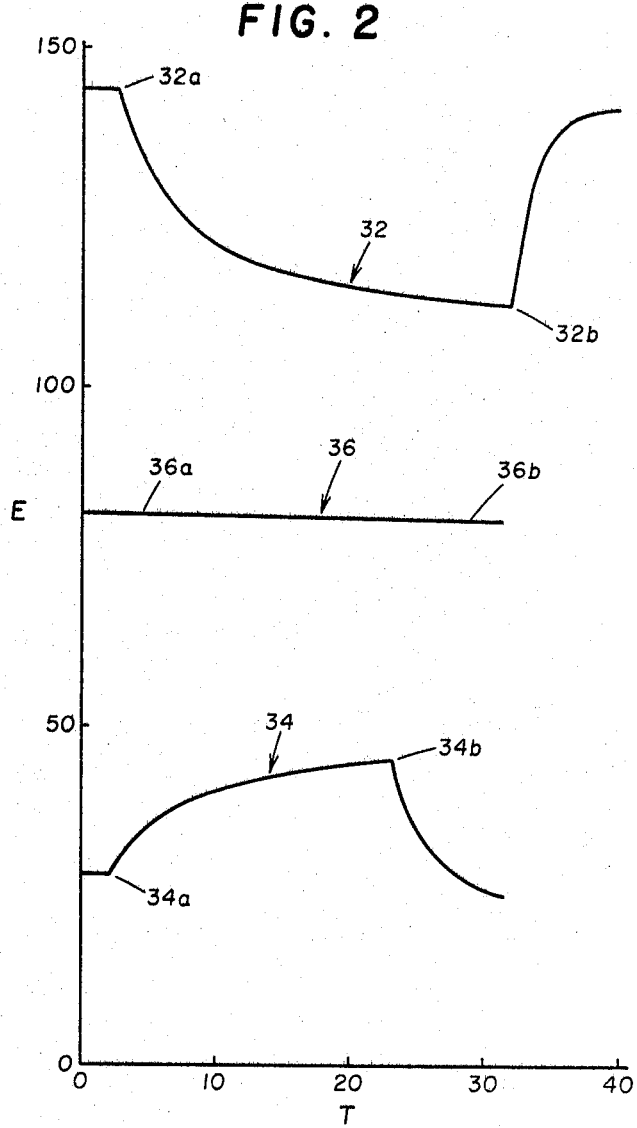
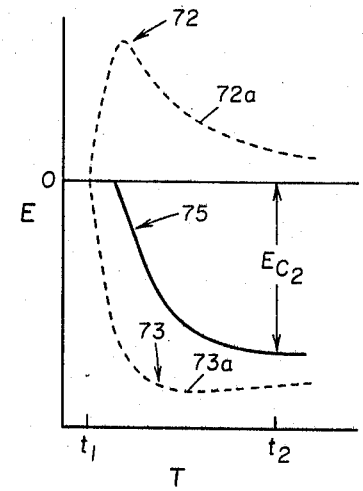
HERMAN C. CUSTARD
INVENTOR
BY *William O. Jackson*
ATTORNEY Dec. 23, 1969      H. C. CUSTARD      3,485,103

APPARATUS FOR MEASURING GRAVITY

Filed Oct. 22, 1965      2 Sheets-Sheet 2

HERMAN C. CUSTARD
INVENTOR

BY *William R. Jackson*

ATTORNEY

United States Patent Office 3,485,103
Patented Dec. 23, 1969

3,485,103
APPARATUS FOR MEASURING GRAVITY
Herman C. Custard, Dallas, Tex., assignor to Mobil Oil Corporation, a corporation of New York
Filed Oct. 22, 1965, Ser. No. 501,626
Int. Cl. G01m 1/12; G01p 15/00
U.S. Cl. 73—382                                    20 Claims

ABSTRACT OF THE DISCLOSURE

A pair of electrolytic cells containing solutions of different concentration and densities are separated by an ion selective membrane. Electrodes are mounted in the cells to detect changes in potential in the cells. Means are provided for selectively preventing or permitting diffusion through the membrane. Acceleration is measured by detecting the changes in potential when diffusion is permitted through the membrane.

---

This invention relates to acceleration measurements and more particularly to acceleration responsive measuring systems which utilize the effect of gravity upon the electrical potential produced by electrochemical concentration cells.

An electrochemical concentration cell with transference comprising two electrolytic solutions of different concentrations separated by an ion-selective membrane and with an electrode in each solution exhibits a definite electromotive force which depends upon, among other things, the ratio of the activity of the ions in the two solutions and the nature of the ion-selective membrane. The electromotive force or electrical potential of the cell may be measured by measuring the potential difference between the two electrodes immersed in the electrolytic solutions. It has long been known that the difference in potential between the electrodes in the concentartion cell may be varied by varying the acceleration exerted upon the system. For example, a work published in 1926 (Brauner, L.: Uber das geo-elektrische Phanomen. Kolloidchemie, Beihefte, 23, 143–152) reported results of tests carried out with the membrane of a concentration cell oriented at different attitudes in the earth's gravitational field. With the cell oriented so that the membrane was in a plane parallel with the earth's gravitational field, the cell potential differed by three to five millivolts from the cell potential measured when the membrane was oriented in a plane normal to the gravitational field. This phenomenon has been termed the "geoelectric effect."

In the present invention the geoelectric effect is utilized in providing new and improved gravity responsive measuring systems.

One characteristic of electrochemical concentration cells is the relatively rapid decay of the cell potential as a function of time. As noted above, the cell potential is a function of the ratio of the activities of the ions in the two solutions and as the concentrations of the solutions tend to equalize with the operation of the cell, thus reducing the activity ratio, the cell potential decreases. In one form of the invention, there is provided a gravity or other acceleration responsive measuring system in which the decay of the cell potential is abated by providing the cell with restrictive means which is operative in a first mode for restricting diffusion if ions and solvent through the membrane and operative in a second mode for admitting such diffusion. In a preferred embodiment of the invention, the restrictive means takes the form of an impermeable barrier which is positioned adjacent the membrane and which is adjustable to an open position with respect to the membrane such that diffusion through the membrane is allowed.

Another difficulty involved in the use of concentration cells in gravity responsive measuring systems lies in the relatively small deviation in the cell potential as a function of the gravitational force applied to the membrane. For example, typical concentration cell exhibits a deviation in potential of about 20 to 30 millivolts when turned from an attitude such that the membrane lies in a plane parallel to the field of gravity to an attitude such that the membrane lies in a plane normal to the field of gravity. In another aspect of the invention, there is provided a gravity responsive measuring system with greatly increased sensitivity. This system is formed by connecting a plurality of concentration cells in series so that the system exhibits an increased deviation in potential in response to a change in gravity.

For a better understanding of the present invention, reference may be had to the following detailed description taken in conjunction with the accompanying drawings in which:

FIGURE 1 is an illustration partly in section showing a concentration cell and an attendant measuring circuit;

FIGURE 2 is a graph showng the results of certain experiments regarding the geoelectric effect;

FIGURE 5 is a graph showing the cumulative potential of a system having primary and secondary cells of opposite polarity in which each cell is provided with restrictive means.

Figure 4:
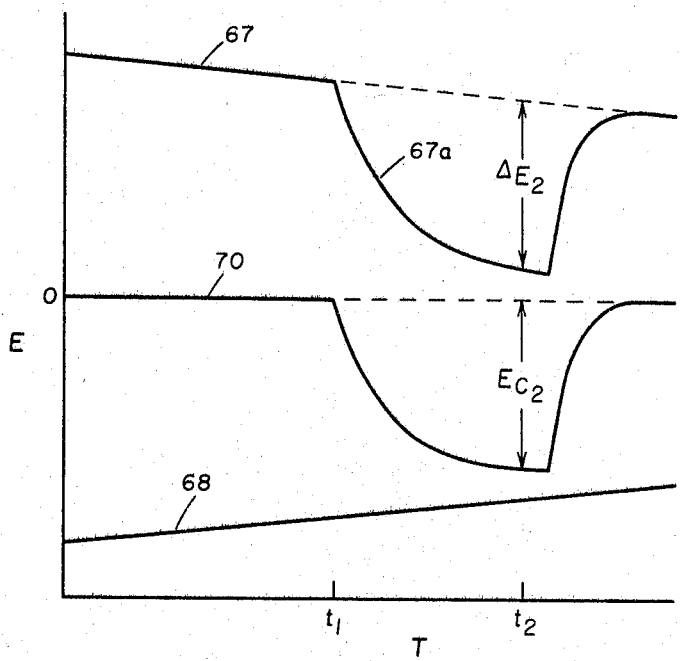
FIGURE 4 is a graph showing the cumulative potential of a system having primary and secondary cells of opposite polarity.

Before describing the method and apparatus of the present invention, reference will be made to certain experimental tests carried out in a study of the geoelectric effect. The concentration cells used in this investigation were of the type Ag, AgCl, electrode; 0.001 N NaCl; membrane; 0.1 N NaCl; AgCl, Ag, electrode. A cell assembly and measuring circuit typical of those used in the experimental work is illustrated in FIGURE 1.

With reference to FIGURE 1, there is shown a concentration cell 10 comprising a cell vessel 12, a membrane 14 dividing the cell vessel into an anode compartment 16 and a cathode compartment 17, and an anode and cathode 18 and 19, respectively. The cell vessel 12 is formed of two cylindrical glass joints 12a and 12b which are clamped together at their flared ends by suitable clamping means (not shown). The membrane 14 is held in place between the flared ends of joints 12a and 12b by two rubber gaskets 21a and 21b. The cell vessel is closed at its outer ends by means of rubber stoppers 22 and 23 through which extend the electrodes 18 and 19 and valved conduits 25 and 26 for use when filling the cell with solution.

The electrodes are connected to a measuring circuit which includes a recorder 30 for measuring and recording as a function of time the potential produced by the cell. Recorder 30, which is of the potentiometric type in order to avoid drawing current from the concentration cell, includes a recording stylus 30a which is adapted to provide a visual readout on a record chart 30b as it is moved relative to the stylus 30a. In the tests hereinafter described, the recorder 30 used was a strip-chart servobalanced potentiometer with a full scale sensitivity of 50 millivolts. Since in these tests the recording range of the recorder was less than the potential produced by the concentration cells under investigation, a potentiometer connected as shown at 31 was used to buck-out part of the cell potential in order to keep the stylus of the recording potentiometer on scale.

As noted above, silver, silver chloride electrodes were utilized in the tests. These electrodes were constructed from 1.29-millimeter silver wire (reagent grade) sealed in a 5-millimeter outside diameter Pyrex tubing. A typical electrode assembly was 12 centimeters long with two centimeters of silver wire exposed for use as the electrode. The silver, silver chloride electrode was prepared by cleaning the two-centimeter length of silver wire which was then made the anode in an electrolysis cell containing an aqueous solution one-tenth normal hydrogen chloride as the electrolyte and platinum gauze as the cathode. A potential in the range of two to three volts was applied across this cell for approximately two hours. The silver, silver chloride electrodes prepared in this manner differed in potential by not more than about two millivolts when placed in one normal sodium chloride at 25° C.

A number of ion-selective and inert membranes were used in carrying out the tests. The cationic ion-selective membrane used was a sulfonated polystyrene supported on Dynel fabric. This membrane was 0.7 millimeter thick and had an exchange capacity of approximately one milliequivalent per gram and a conductance of approximately 75 millimhos per square centimeter. The anionic ion-selective membrane used was 0.7 millimeter thick and formed of a mixture of weak and strong polymeric amines supported on Dynel fabric. It had an exchange capacity of approximately one milliequivalent per gram and a conductance of approximately 40 millimhos per square centimeter. The inert membrane used in these tests was made from a high molecular weight polyvinyl chloride. This membrane was approximately 0.8 millimeter thick and had an average pore size of five microns.

The sodium chloride solutions utilized in these experiments were prepared from distilled water having a specific resistance value ranging from $1.0 \times 10^6$ ohm-cm. to $2.0 \times 10^6$ ohm-cm. and an average surface tension of about 71 dynes per centimeter.

In carrying out the tests, the anode and cathode compartments of the cell were filled with 0.1 normal sodium chloride solution and 0.001 normal sodium chloride solution, the more concentrated solution being placed in the cathode compartment. During the test the cell was handled in a manner such that the 0.1 normal solution in the cathode compartment was prevented from being positioned above the dilute solution in the anode compartment.

In one form of experimental procedure followed, the concentration cell was maintained in a static condition and first oriented at an attitude such that the membrane plane was vertical, i.e., parallel to the force of gravity, and thereafter oriented at an attitude such that the membrane plane was horizontal, i.e., normal to the force of gravity. The membrane was maintained in the vertical position for a period of about 20 to 30 minutes or longer until a cell potential exhibiting a stable decay rate was established. At this point, the cell was turned so that the membrane was in the horizontal position. After a period of about 20 to 30 minutes or longer in this position, the cell was returned to its original position with the membrane in a vertical plane. The results of such a test with a cell having the cationic ion-selective membrane described above are shown in FIGURE 2 in which curve 32 is a plot of the cell potential, E, in millivolts versus time, T, in minutes. The first portion of curve 32 shows the cell potential with the membrane in a vertical plane. At point 32a of the curve, the cell was turned to a position with the membrane in a horizontal plane and as shown the potential decreased at a relatively rapid rate and then more gradually. At point 32b the cell was returned to its initial position and the cell potential increased rapidly to a value on the order of that expected if the cell had remained undisturbed with its membrane in the vertical position.

Curve 34 in FIGURE 2 illustrates the results of a similar test carried out with a cell having the anionic ion-selective membrane described above. The membrane was turned from the vertical to the horizontal at point 34a and then back to the vertical at point 34b. As can be seen from FIGURE 2, the results of this test are similar to those of the preceding test except that here the geoelectric effect appeared as an increase in cell potential.

In addition to static tests such as those described above, certain dynamic experiments were carried out by subjecting a cell to a centrifugal force. In one such test a cell with the inert membrane was oriented at an attitude with the membrane in a plane at an angle of 45° from the vertical. A centrifugal force then was applied to the cell such that the resultant force normal to the membrane was slightly greater than the force of gravity. After a period of time, the centrifugal force was removed. The results of this test are shown by curve 36, points 36a and 36b indicating respectively the points at which the centrifugal force was applied and removed. As indicated by curve 36, the cell is indifferent to changes in force and exhibits no geoelectric effect.

In view of the tests described above, it will be recognized that concentration cells comprising either cationic or anionic ion-selective membranes may be used in the present invention, the geoelectric effect appearing as a decrease in potential for a cationic membrane and as an increase for an anionic membrane. It should be noted, however, that the Ag, AgCl electrodes used in these tests were reversible to the anions, i.e. chloride ions, in solution. In the reverse situation, i.e., in a cell having electrodes reversible to the cations, the geoelectric effect will appear as an increase in cell potential for a cell having a cationic ion-selective membrane and as a decrease in one having an anionic membrane. Also, it will be recognized by those skilled in the art that in this case the polarity of the cell electrodes will be reversed. That is, the anode will be found in the more concentrated solution and the cathode in the dilute solution. It usually will be preferred to utilize anion-reversible electrodes in practicing the instant invention.

As noted above, electrochemical cells with transference exhibit a relatively high decay rate of the cell potential. This of course severely retracts their operating life, in most cases to a day or less, and presents a definite obstruction to their utilization in gravity responsive measuring devices such as are used in gravity surveys of the earth's crust. Gravitation surveys such as those used in exploration for oil, gas, or other mineral deposits in the earth's crust often are carried out for protracted periods in relatively inaccessible locations. For such surveys it is a practical requirement that the instruments used have a relatively long functional life.

Figure 3:
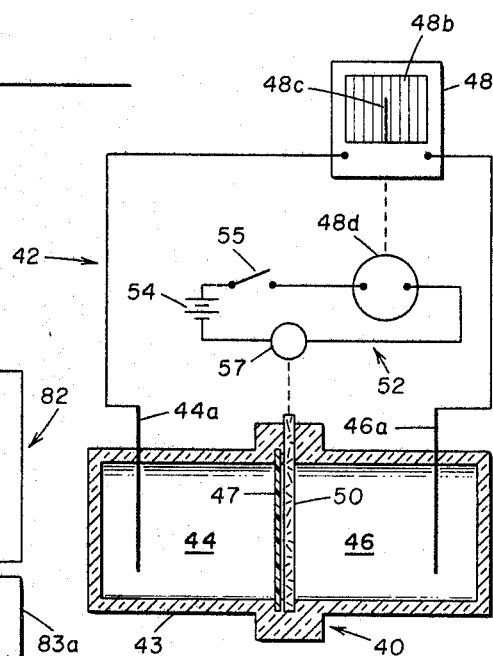
FIGURE 3 is an illustration partly in section showing a concentration cell having restrictive means in accordance with one aspect of the invention.

In accordance with one aspect of the invention and as shown in FIGURE 3, there is provided a concentration-cell gravity responsive measuring system which includes means for abating the decay of the cell potential when the system is not being used to obtain gravity measurements. With reference to FIGURE 3, there is shown a gravity responsive measuring system comprising a concentration cell 40 connected to a suitable measuring circuit 42. Cell 40 comprises a cell vessel 43 which is divided into an anode compartment 44 and a cathode compartment 46 by an ion-selective membrane 47. Cell compartments 44 and 46 contain electrolytic solutions of different concentrations, the solution in compartment 44 having a lower concentration than the solution in compartment 46. An anode 44a and a cathode 46a are connected by means of measuring circuit 42 to a suitable potentiometric measuring and recording device 48. Recorder 48 may be a graphic recording instrument of the type described above in which a drum-mounted chart 48b is moved relative to a recording stylus 48c by means of a motor 48d.

In accordance with the instant invention, the cell 40 in FIGURE 3 is provided with restrictive means operative means operative in a first mode for restricting diffusion of electrolyte through the membrane 47 and operative in a second mode for admitting such diffusion. As shown in FIGURE 3, this restrictive means comprises an impermeable barrier 50 which is slidably positioned in compartment 46 adjacent membrane 47. With barrier 50 in the closed position, it functions to restrict, i.e., substantially impede and preferably prevent, diffusion of electrolyte from compartment 46 to compartment 44. Thus, there will be no decay in cell potential due to changes in the activity ratio of the ions in the two compartments. When it is desired to make a measurement with the disclosed system, barrier 50 is moved to an open position which admits of transference of ions between the two compartments. This is accomplished simply by withdrawing barrier 50 from compartment 46. More particularly, and with reference to FIGURE 3, the instant system includes an operating circuit 52 which comprises a power source 54, a switch 55, a barrier operating solenoid 57, and the aforementioned drum motor 48d. With switch 55 open, the barrier operating solenoid 57 is de-energized and the barrier is in the closed position shown. When it is desired to take a gravity measurement, cell 40 may be oriented at a position such that membrane 47 lies in a plane having a component normal to the force of gravity and switch 55 is closed. With the closure of switch 55, solenoid 57 is energized and functions to withdraw barrier 50 from the cell to an open position. Simultaneously therewith, motor 48d is energized and starts to move chart 48b relative to recording stylus 48c. Switch 55 is maintained in the closed position for a period sufficient to obtain the desired potential measurements, preferably until the measured cell potential has achieved a stable decay rate. Thereafter switch 55 is opened and the solenoid 57 is de-energized, returning barrier 50 to the closed position shown. While in the embodiment illustrated the restrictive means takes the form of a slidable barrier, it will be recognized that other suitable means may be used. For example, rather than being slidable, the barrier may take the form of a louvered shutter in which case the louvers would be closed with switch 55 open and open with switch 55 closed.

The barrier may be formed of any material which is not subject to attack by the cell electrolyte. However, the barrier preferably is formed of a nonconductor since with a barrier formed of an electron conductor, e.g., platinum, a cell potential will exist even though the barrier is in the closed position. A suitable nonconductor for forming the barrier is Teflon (polyetetrafluoroethylene).

In the system illustrated in FIGURE 3, the potential measurments recorded by means 48 do not show directly the deviation of the cell potential in response to an unknown gravity condition from the cell potential as it exists under a standard gravity condition at the same magnitude of time. This deviation in cell potential (hereinafter called $\Delta E$) may be determined by correlating the measured potential obtained under an unknown gravity condition with the cell potential as is known to exist under a standard gravity condition, e.g., with the membrane barrier parallel with the gravitational field. This may be done graphically by plotting both cell potentials versus time and substracting one from the other.

While $\Delta E$ may be accurately determined by the above-described correlation technique, it often will be advantageous to record $\Delta E$, or a representative component thereof, directly by modifying the readout of the potential measuring means to compensate for the decay of the cell potential from the potential existing initially or at some other reference time. In one embodiment of the invention this is accomplished by providing in the measuring circuit a secondary concentration cell, the potential of which decays at the same rate as the potential of the primary cell utilized to take the gravity measurements. The secondary cell is connected in the measuring circuit such that its potential is opposite in polarity to the potential produced by the primary cell. The secondary cell is maintained under a standard gravity condition, e.g., with its plane parallel to the gravitational field, so that the potential sensed by the measuring means, and therefore the readout produced thereby, is directly representative of the $\Delta E$ produced by the primary cell in response to an unknown gravity condition.

For a better understanding of this form of the invention, reference is made to FIGURE 4 in which curves 67 and 68 are plots of potential, E, versus time, T, for identical primary and secondary cells respectively. As can be seen from FIGURE 4, with both cells under the same standard gravity condition, e.g., with their membranes in a vertical plane, the potential of the secondary cell exactly bucks out the potential of the primary cell giving a constant (in this case, zero) cumulative reference potential shown by curve 70. When at a time $t_1$ the primary cell is oriented to an attitude with its membrane in a horizontal plane, its potential decreases rapidly to give a potential deviation $\Delta E_2$ at time $t_2$. Since during the period $t_1$–$t_2$, the potential of the secondary cell decays at a rate equal to the decay rate of the primary cell under the standard gravity condition, the cumulative potential of the system $E_{c_2}$ at time $t_2$ is equal to the $\Delta E_2$ of the primary cell.

One particularly important advantage realized in this embodiment of the invention can be seen from an examination of FIGURE 5 in which curves 72 and 73 are plots of potential, E, versus time, T, for primary and secondary cells, respectively, and curve 75 is a plot of the cumulative potential of the system versus time. Each cell is provided with respective means such as is illustrated in FIGURE 3 and the cells are oriented as described above with the primary cell membrane in a horizontal plane and the secondary cell membrane in a vertical plane. When at time $t_1$ the restrictive means in each cell is moved to its open position, the potential of the primary cell will initially increase and then decrease in response to the gravitational field, the segment 72a of curve 72 corresponding to a portion of segment 67a of curve 67 shown in FIGURE 4. Simultaneously, the potential of the secondary cell will initially increase until it achieves a stable rate of decay as indicated by segment 73a of curve 73, this portion of the curve corresponding to curve 68 in FIGURE 4. As can be seen from FIGURE 5, the cumulative potential $E_{c_2}$ at a time $t_2$ after the secondary cell potential has stabilized is equal to the $\Delta E$ produced by the primary cell at this time. Thus, the deviation of the primary cell potential in response to an unknown gravity condition can be determined in the field directly from the readout of the measuring means without recourse to further computations.

The secondary cell may be of any suitable type that produces a potential which decays at the same rate as the potential produced by the primary cell. However, it usually will be most convenient to utilize a secondary cell which is identical in its functional components with the primary cell, and this arrangement is preferred. By functional components is meant those cell constituents which affect the potential decay, such as the membrane, electrodes, and electrolytic solutions. Also, the cells preferably will be at the same temperatures since the potential produced by concentration cells is a direct function of temperature.

Means other than a secondary cell may be provided to modify the readout of the measuring means. For example, the modulating means may take the form of a voltage generator that produces a potential in the measuring circuit of the same polarity as the primary cell potential and which increases at the same rate as the primary cell decays.

In gravitational surveying procedures, gravity usually is expressed in a unit of acceleration called the gal which is by definition equal to one centimeter per second per second. The value of gravity at the earth's surface is approximately 980 gals and usually will vary locally by much less than one gal. For convenience, therefore, the milligal usually is used to express relative garvity variations.

As noted previously, a typical concentration cell of the type described above will exhibit a deviation in potential of about 20 to 30 millivolts at about 20 minutes after the membrane is changed from a vertical to a horizontal position. This is equivalent to a response of about 0.02 to 0.03 millivolt for a gravity differential of one gal. In accordance with another aspect of the invention, a gravity responsive measuring system of increased sensitivity is provided by connecting a plurality of cells in series such that their potentials are all of the same polarity. In this manner, the deviation in potential in response to relative gravity changes is increased. For example, if a single cell has a response of 0.03 millivolt per gal, a bank of ten such cells in series as described above will have a response of 0.30 millivolt per gal or 0.003 millivolt per milligal.

Figure 6:
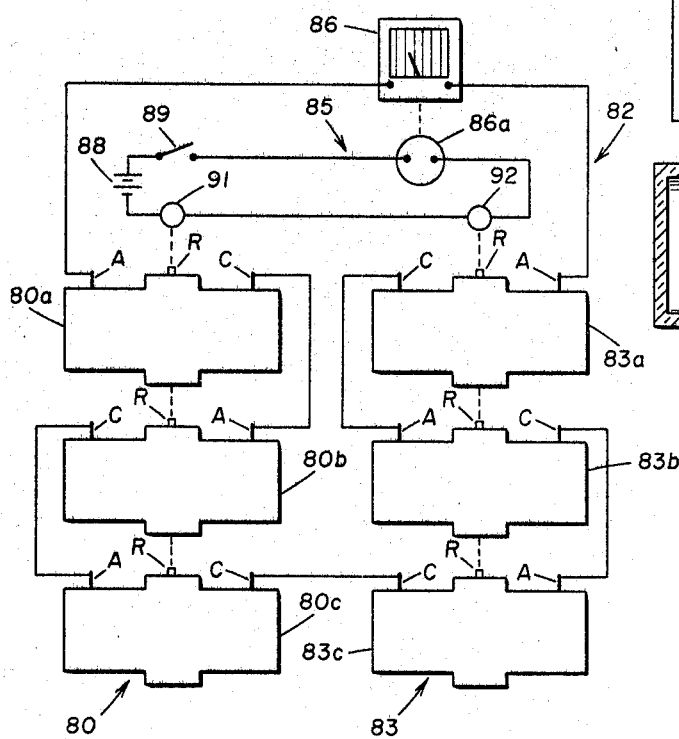
FIGURE 6 is an illustration showing a preferred form of a gravity responsive measuring system embodying the invention.

Referring now to FIGURE 6, there is shown a preferred form of a gravity responsive measuring system which incorporates this feature of the invention as well as those previously described. The system of FIGURE 6 comprises a primary cell bank 80, a measuring circuit 82 including a secondary cell bank 83, and an operating circuit 85.

Each of the primary and secondary banks comprises, respectively, a plurality of concentration cells 80a, 80b, and 80c, and 83a, 83b, and 83c connected in series as shown. Each of these cells has an anode and cathode A and C, respectively, and a restrictive means R such as the removable barrier disclosed in FIGURE 3. As is apparent from an examination of FIGURE 6, the potential produced by each bank will be equal to the cumulative total potential produced by its respective cells and the potential produced by the secondary bank 83 will be opposite in polarity to the potential produced by the primary bank 80.

In addition to secondary cell bank 83, the measuring circuit also includes a potentiometric recorder 86 of the type described above which includes a motor 86a that functions to move the record chart relative to the stylus. The operating circuit 85 comprises motor 86a, a power source 88, a switch 89, and a pair of barrier operating solenoids 91 and 92, solenoid 91 being operatively connected with the restrictive means in the primary cell bank for simultaneous operation thereof and solenoid 92 being similarly connected with the restrictive means in the secondary bank.

In operation of the system of FIGURE 6, the cells comprising the primary bank are oriented at a position such that their membranes lie in a plane having a component normal to the gravitational field to be measured and the cells comprising the secondary bank are maintained under a known standard gravity condition, e.g., with their membranes normal to the gravitational field. Upon closure of switch 89, solenoids 91 and 92 are energized and function to move conjointly the restrictive means in the respective cells to the open position. Also, upon closure of switch 89, motor 86a is energized and moves the chart of recorder 86 relative to the recording stylus. After the desired potential measurements are obtained, switch 89 is opened and solenoids 91 and 92 then act to move simultaneously the restrictive means to their respective closed positions.

In experiments relating to this invention, the geoelectric effect illustrated appeared only in cells having solutions of different densities and only when the cell was oriented with the more dense solution below the less dense solution. Therefore, in carrying out the instant invention, the primary cell or cells should be oriented with the more dense solution in the direction relative to the less dense solution of the gravitational or other accelerational field to be measured. The more dense solution normally will be the solution of greater concentration. However, this situation may be reversed, for example, by the use of density moderators, so that the concentrated solution has a density less than the dilute solution. This usually will not be preferred since such a cell normally will exhibit a relatively short life and because of other practical complications.

Theoretically, the electrolytic solutions may be of any concentration so long as the concentration of one is different from the concentration of the other. However, certain practical limitations should be considered. Cells having solutions of relatively high concentration differentials tend to yield a greater sensitivity than those having solutions of lower concentration differentials. However, increasing the concentration differential of a cell also tends to increase the potential decay rate. Also a decrease in the concentrations of the electrolytic solutions is accompanied by a decrease in sensitivity of the potential measuring means due to the relatively high resistances in solutions of lower concentrations. The optimum ratio of the concentration of the dilute solution to that of the concentrated solution to achieve a suitable balance between potential decay rate and sensitivity is within the range of about 0.03 to 0.003. It is preferred to utilize in the instant invention cells in which the concentrated solution has a normality of about $0.1 \pm 0.05$ and the dilute solution a normality of about $0.001 \pm 0.0005$.

The cell electrodes utilized in systems embodying the instant invention preferably will be reversible to ions in the electrolytic solutions. Nonreversible electrodes may be used, but they tend to give a highly unstable and unpredictable cell potential.

Concentration cells utilized in the instant invention may comprise solutions of different electrolytes and in some instances such cells have been found to be more sensitive than cells using the same electrolyte. However, it is believed that any advantages gained by such increased sensitivity would in most cases be more than offset by difficulties involved in cell operation and interpretation of results and it usually will be preferred to utilize cells having the same electrolyte in both compartments.

In carrying out gravitational surveys in accordance with this invention, various properties of the earth's gravitational field may be ascertained. For example, a survey may be carried out to ascertain the relative gravity of the area under investigation, i.e., the value of gravity at any station in the area in reference to a known or assumed absolute value of gravity at some base station. Also, the gravity gradient, i.e., the rate of horizontal variation of gravity or the rate of change of gravity per horizontal distance, may be determined.

In utilizing the instant invention in gravitational surveys, the cells or cell comprising the measuring system are calibrated under known gravity conditions in order to determine the response of the system to gravity changes. Gravity measurements then are taken as desired at a plurality of measuring stations spaced horizontally from each other with respect to the earth's surface. At each of these stations the primary cells or cell are oriented at an attitude such that their membranes lie in a plan having a component normal to the force of gravity. Preferably, each membrane will lie in a horizontal plane in order to achieve a maximum deviation in cell potential in response to fluctuations in the gravitational field. At each of these locations a component of the potential produced by the system is measured and recorded. These components then are correlated with respect to each other and the locations at which they were obtained. This may be accomplished by plotting the deviation in cell potential from the cell potential produced under a standard gravity condition (ΔE) or its equivalent in gals or milligals on a geographical map of the area surveyed.

In most cases, it is preferable to use measurements obtained after about 20 minutes or more after the cell has been oriented with its membrane in the desired position, or in the case of a system having restrictive means as described above, after the restrictive means has been moved to the open position. Also, it is preferred to make the correlation on the basis of measurements obtained at the same magnitude a time after orientation of the cell to the desired position or movement of the restrictive means to the open position.

The results of the gravitational survey are interpreted in accordance with established procedures in the art of geophysical exploration to ascertain in the earth's crust of areas of gravitational properties which are indicative of the propinquity of subsurface structures favorable to the accumulation of mineral deposits, such as oil and gas. Thereafter, further exploratory work may be carried out by drilling one or more wells in such an area.

Having described specific embodiments of the instant invention, it will be understood that further modifications thereof may be suggested to those skilled in the art, and it is intended to cover all such modifications as fall within the scope of the appended claims.

What is claimed is:

1. In an acceleration responsive measuring system:
   a concentration cell divided into first and second compartments by an ion-selective membrane and having in each of said first and second compartments, respectively, first and second electrodes and first and second electrolytic solutions of different concentrations and densities,
   an electrical circuit connected to said first and second electrodes,
   means in said circuit for measuring a component of the potential difference across said electrodes, and
   means in said cell operative in a first mode for restricting diffusion of material through said membrane and operative in a second mode for admitting such diffusion.

2. The system of claim 1 wherein said restricting means comprises an impermeable barrier positioned adjacent said membrane in one of said compartments, said barrier being adjustable to an open position with respect to said membrane.

3. The system of claim 2 wherein said barrier is formed of a nonconductive material.

4. The system of claim 1 wherein each of said electrodes is reversible with respect to ions of the electrolytic solution in its respective compartments.

5. The system of claim 4 wherein said electrolytic solutions are solutions of the same electrolyte.

6. The system of claim 5 wherein said electrodes are reversible to the anions of said electrolyte.

7. In an acceleration responsive measuring system:
   a concentration cell divided into first and second compartments by an ion-selective membrane and having in each of said first and second compartments, respectively, first and second electrodes and first and second electrolytic solutions of different concentrations and densities, said cell producing an electrical potential between said electrodes which decays with time,
   an electrical circuit connected to said first and second electrodes,
   potential measuring means in said circuit for producing a readout representative of a component of the cell potential, and
   modulating means operatively connected to said measuring means for modifying said readout to compensate for the decay of the cell potential from the cell potential existing at a reference time.

8. The system of claim 7 wherein said modulating means comprises voltage generating means in said circuit for producing a potential in said circuit which varies as a function of time inversely of the decay of said cell potential.

9. The system of claim 8 wherein the potential produced by said voltage generating means is opposite in polarity to said cell potential.

10. In an acceleration responsive measuring system:
    a plurality of concentration cells, each of said cells divided into first and second compartments by an ion-selective membrane and having in each of said first and second compartments, respectively, first and second electrodes and first and second electrolytic solutions, and said second electrolytic solution having a greater concentration and a different density than said first solution,
    an electrical circuit connecting said cells in series with the first electrode of each of said cells being connected to the second electrode of another of said cells whereby said cells each produce a potential of the same polarity, and
    means in said circuit for measuring a component of the cumulative total potential produced by said cells.

11. The system of claim 10 further comprising in each of said cells means operative in a first mode for restricting diffusion of material through the membrane in said each of said cells and operative in a second mode for admitting such diffusion.

12. The system of claim 11 further comprising means operatively interconnecting said restricting means for conjoint operation thereof between said first and second modes.

13. The system of claim 12 wherein said restricting means in said each of said cells comprises an impermeable barrier positioned in one of said compartments adjacent said membrane, said barrier being adjustable to an open position with respect to said membrane.

14. The system of claim 10 wherein said cells are identical in their functional components.

15. In an acceleration responsive measuring system:
    a primary concentration cell divided into first and second compartments by an ion-selective membrane and having in each of said first and second compartments, respectively, a first electrode and a second electrode and a first electrolytic solution and a second electrolytic solution of a greater concentration and a different density than said first solution, said primary cell producing an electrical potential across its electrodes which decays with time,
    a secondary concentration cell divided into first and second compartments by an ion-selective membrane and having in each of said first and second compartments, respectively, a first electrode and a second electrode and a first electrolytic solution and a second electrolytic solution of a greater concentration than said first solution, said secondary cell producing an electrical potential difference across its electrodes which decays with time at the same rate as the potential produced by said primary cell,
    an electrical circuit connecting the first and second electrodes of said primary cell to the first and second electrodes, respectively, of said secondary cell whereby the potential produced by said secondary cell is opposite in polarity to the potential produced by said primary cell, and
    potential measuring means in said circuit for producing a readout representative of the potential sensed by said measuring means.

16. The system of claim 15 further comprising in each of said cells means operative in a first mode for restricting diffusion of material through the membrane in said each of said cells and operative in a second mode for admitting such diffusion.

17. The system of claim 16 further comprising means operatively interconnecting said restricting means for conjoint operation thereof between said first and second modes.

18. The system of claim 16 wherein said restricting means in said each of said cells comprises an impermeable barrier positioned in one of said compartments adjacent said membrane, said barrier being adjustable to an open position with respect to said membrane.

19. The system of claim 18 wherein said barrier is formed of a nonconductive material.

20. The system of claim 15 wherein said cells are identical in their functional components.

References Cited

UNITED STATES PATENTS

| | | | |
|---|---|---|---|
| 2,661,430 | 12/1953 | Hardway | 310—2 |
| 3,065,365 | 11/1962 | Hurd et al. | 310—2 |

RICHARD C. QUEISSER, Primary Examiner

ROBERT S. SALZMAN, Assistant Examiner

U.S. Cl. X.R.

73—516; 310—2